(12) United States Patent
Shah

(10) Patent No.: US 7,047,439 B2
(45) Date of Patent: May 16, 2006

(54) ENHANCING RELIABILITY AND ROBUSTNESS OF A CLUSTER

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/889,493

(22) Filed: Jul. 12, 2004

(65) Prior Publication Data

US 2005/0005187 A1    Jan. 6, 2005

Related U.S. Application Data

(63) Continuation of application No. 09/537,394, filed on Mar. 29, 2000, now Pat. No. 6,766,470.

(51) Int. Cl.
*G06F 11/00* (2006.01)

(52) U.S. Cl. .......................................... 714/9
(58) Field of Classification Search .................. 714/9
See application file for complete search history.

(56) References Cited

U.S. PATENT DOCUMENTS

| | | | |
|---|---|---|---|
| 5,787,019 A | 7/1998 | Knight et al. ............... 364/550 |
| 6,085,265 A | 7/2000 | Kou ............................. 710/63 |
| 6,108,699 A | 8/2000 | Moiin ......................... 709/221 |
| 6,151,688 A | 11/2000 | Wipfel et al. .................. 714/48 |
| 6,263,452 B1 * | 7/2001 | Jewett et al. .................. 714/9 |
| 6,308,184 B1 * | 10/2001 | Hewitt ........................ 707/205 |
| 6,334,155 B1 | 12/2001 | Long et al. .................. 709/250 |
| 6,412,078 B1 * | 6/2002 | Murotani et al. .............. 714/9 |
| 6,493,715 B1 | 12/2002 | Funk et al. .................... 707/10 |
| 6,654,707 B1 * | 11/2003 | Wynn et al. ................. 702/186 |
| 6,725,405 B1 * | 4/2004 | Batten et al. ................ 714/724 |
| 6,735,720 B1 * | 5/2004 | Dunn et al. .................... 714/43 |
| 6,954,851 B1 * | 10/2005 | Natu ............................ 713/2 |

* cited by examiner

*Primary Examiner*—Robert Beausoliel
*Assistant Examiner*—Michael Maskulinski
(74) *Attorney, Agent, or Firm*—Schwegman, Lundberg, Woessner & Kluth, P.A.

(57) ABSTRACT

A cluster having a host connected thereto via a cluster interconnection fabric where a determination is made as to whether an error condition exists in an I/O controller connected to the host via the cluster interconnection fabric. This is achieved by attempting to communicate with the I/O controller a first predetermined time period after an inquiry by an operating system as to whether or not an I/O controller driver stack should be unloaded. Also, the operating system is commanded to unload the I/O controller driver stack upon a determination that the error condition still exists.

20 Claims, 7 Drawing Sheets

ENHANCING RELIABILITY AND ROBUSTNESS OF A CLUSTER

This application is a continuation of U.S. patent application Ser. No. 09/537,394, filed Mar. 29, 2000, now issued as U.S. Pat. No. 6,766,470, which is incorporated herein by reference.

FIELD

The present invention relates to a technique for enhancing the reliability and robustness of a cluster.

BACKGROUND

A cluster consists of one or more hosts and one or more I/O (input/output) units containing I/O controllers, the hosts and I/O controllers being connected together by a common interconnection fabric. One common problem in a cluster arrangement is that there often are single points of failure in the cluster. While adding redundant elements to the cluster may eliminate some single points of failure, unfortunately, some present operating systems do not give a cluster an opportunity to recover from an element failure by substituting a redundant element. Furthermore, a failure in the cluster may be either transient or permanent. Unfortunately, present-day arrangements do not enable a cluster to automatically recover from a transient failure.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims. It is also to be understood that hardware alone, software alone, or a combination of hardware and software can be used to implement the present invention and it is to be further understood that the present invention is not limited to one particular embodiment.

The following represents brief descriptions of the drawings, wherein.

DETAILED DESCRIPTION

Figure 1:
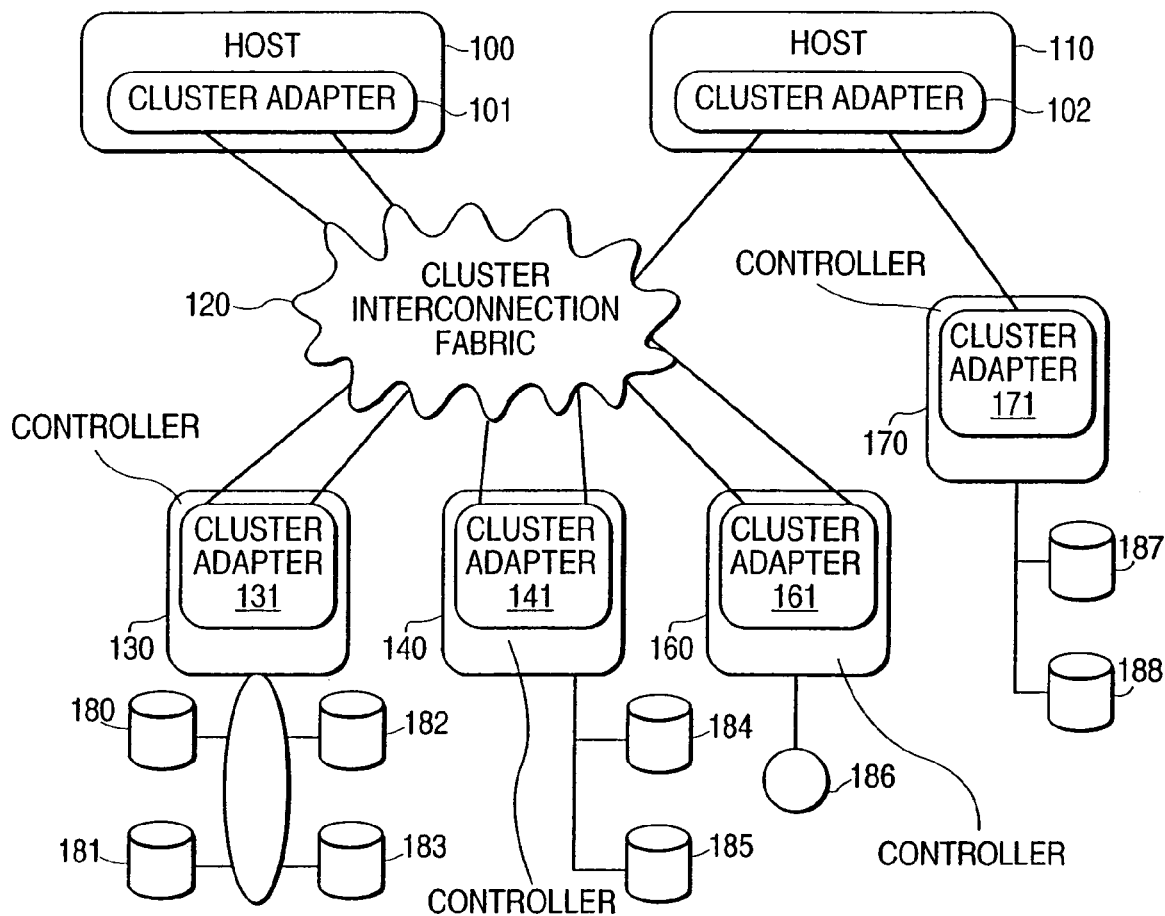
FIG. 1 is a block diagram of an example cluster.

Before beginning a detailed description of the subject invention, mentioning of the following is in order. When appropriate, like reference numeral and characters may be used to designate identical, corresponding or similar components in differing figured drawings. Further, in the detailed description to follow, example sizes/models/values/ranges may be mentioned, although the present invention is not limited thereto. Still further, various well known elements and power connections to ICs and other components may not be shown within the drawing figures for simplicity of illustration and discussion and so as not to obscure the present invention.

A cluster consists of one or more hosts or servers and one or more I/O (input/output) units which contain I/O controllers. Server hosts actively use one or more fabric attached I/O controllers, e.g., SCSI adapters, network adapters, etc., to service client requests. The hosts and I/O units containing I/O controllers are connected together by a cluster interconnection fabric.

Each cluster host is connected to the cluster using one or more cluster adapters. Clusters are typically used for server workloads where reliability and uninterrupted operation are extremely important. One common technique used to achieve this goal is to remove single points of failure in the cluster. Failures in the fabric interconnection links and switches may be recovered from by creating redundant fabrics. Failures of I/O controllers may be recovered from by using multiple I/O controllers with matching I/O devices that each perform the same I/O operation and take over when one I/O controller fails. Along the same lines, it is important that a host does not lose cluster connectivity when the cluster adapter that connects the host to the cluster fails. This can be achieved by utilizing multiple plug-in cluster adapters in the host with the expectation that if the host has multiple cluster adapters, when one cluster adapter fails, another functioning cluster adapter can be used to communicate with the I/O controllers and other hosts that this host was using.

Under Windows 2000, for example, it is not sufficient to simply insert multiple cluster adapters to ensure continued operation upon a cluster adapter failure since if a cluster adapter fails, the operating system will unload the device driver stacks for I/O controllers that are the "children" of this cluster adapter, that is, that are using this cluster adapter to communicate with a remote 110 controller. The device driver stack for a fabric attached I/O controller is not even given an opportunity to recover from the failure by using a different cluster adapter.

Additionally, automatic recovery from a failure is an important and highly desirable property for clusters. A failure in the cluster may be transient or permanent. A transient failure is one that corrects itself within an acceptable time frame and allows normal operation to be resumed while a permanent error causes a perturbation in the cluster and requires one or more hardware or software components to be manually repaired and restarted. One possible failure in the cluster is that the connection between a host and its fabric attached I/O controller is broken. The following transient failures can result in a loss of connection between a host and its fabric attached I/O controller:

A. One end of the connection, either the host or the I/O controller, may be overwhelmed with work and is unable to respond to requests or responses in a timely manner. Accordingly, the other end times out and perceives this as a failure of the path between the two end points. The problem would disappear upon the backlog of work being completed. However, the other end is unaware of the fact that the failure is transient and may assume that the failure is permanent after a preset number of retries fail.

B. The communication between the hosts and I/O controller may be effected through a switch that is overwhelmed with cluster traffic. This may be due to a transient burst of traffic through the switch. Accordingly, the switch starts discarding cluster packets and the I/O requests or responses never reach their intended target. The host and/or I/O controller perceives this as a communication failure. The problem will disappear upon the congestion in the switch being over. However, the host is unaware of the fact that the failure is transient and may assume that the I/O controller is permanently unavailable after a preset number of retries fail.

C. There may be multiple physical paths between the host and I/O controller and a path used for communication between the host and I/O controller may be physically damaged or unplugged. The fabric management software may detect this problem and automatically correct it by routing around the damaged path using another path between the host and I/O controller. Communication may be restored but not before one or both end points time out on pending requests. This time out may be received as a permanent failure of the path there between. The problem would be alleviated once the problem path has been routed around but the host may be unaware of the fact that the failure is transient and assume that the I/O controller is permanently unavailable after a preset number of retries fail. Each of the failures noted above is a transient recoverable failure but in each case the failure is visible to one or both end points and explicit action must be taken to recover from it. The recovery may be partial or complete. A complete recovery is one in which all I/O operations pending at the time of failure are retried and completed successfully upon the transient error condition ending while a partial recovery is one in which the I/O operations pending at the time of failure are not retried but the I/O controller is available for issuing new requests when the transient error condition ends.

FIG. 1 illustrates an example cluster with multiple hosts and I/O units containing I/O controllers.

Host 100 and host 110 respectively include cluster adapters 101 and 102 for interfacing the respective hosts to the cluster interconnection fabric 120. The hosts 100 and 110 may be directly connected to an I/O controller 170 as in the case of host 110. Alternatively, the hosts 100 and 110 may be connected to I/O controllers 130, 140, and 160 via the cluster interconnection fabric 120. In the illustrated example, hosts 100 and 110 are connected to I/O controllers 130, 140, and 160 via the cluster interconnection fabric 120. Each of the I/O controllers 130, 140, 160, and 170 includes its own cluster adapter, 131, 141, 161, and 171 for respective I/O controllers 130, 140, 160, and 170. The I/0 controllers 131, 141, 161, and 171 serve as interfaces between the hosts 100 and 110 and various devices 180–188 which may include SCSI adapters, network adapters, etc.

Figure 2:
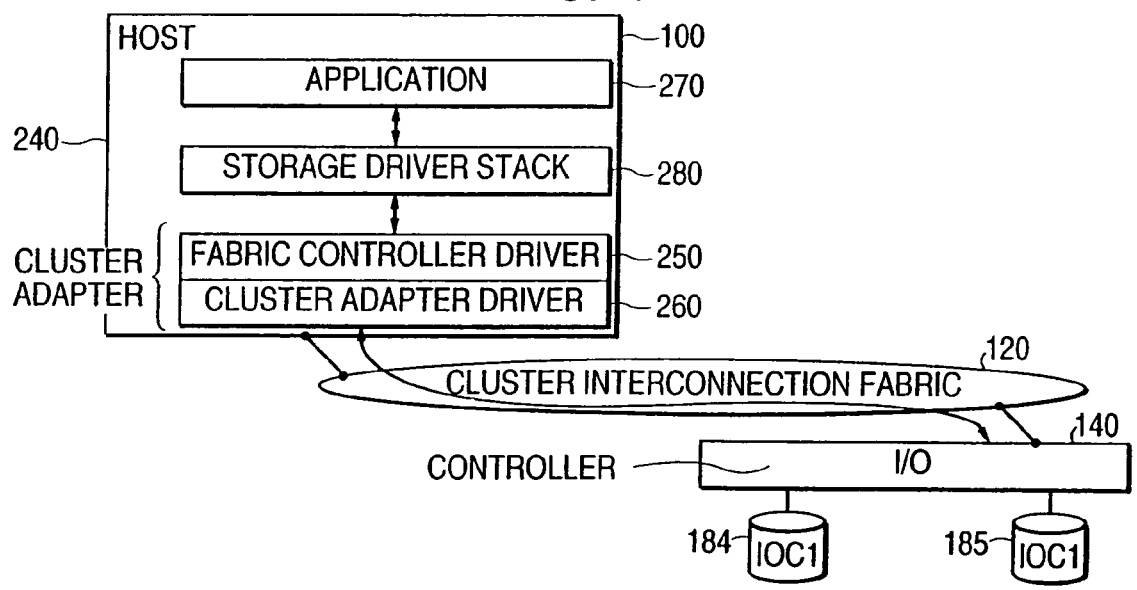
FIG. 2 illustrates an example of the host software using an I/O controller.

FIG. 2 illustrates an example of the host cluster adapter operating from a cluster host 100 that uses the services of a fabric attached I/O controller 140. Only one host 100 and one I/O controller 140 has been shown for the sake of simplicity. The cluster interconnection fabric 120 may include switches and may have one or more physical links that is—paths between the host 100 and the I/O controller 140. The host 100 connects to a cluster using a cluster adapter 240. The cluster adapter 240 includes a fabric controller driver 250 and a cluster adapter driver 260. The fabric controller driver 250 provides an I/O bus abstraction for the interconnection fabric to the host operating system. The fabric controller driver 250 contains information as to how to locate, identify and address fabric attached I/O controllers that this host is allowed to access and is responsible for detecting fabric attached I/O controllers and reporting them to the operating system of the host. When the fabric controller driver 250 reports an I/O controller to the operating system, the operating system loads the device driver stack for that I/O controller and the I/O controller driver stack in turn advertises the resources available on the I/O unit for use by applications and other clients.

Figure 3:
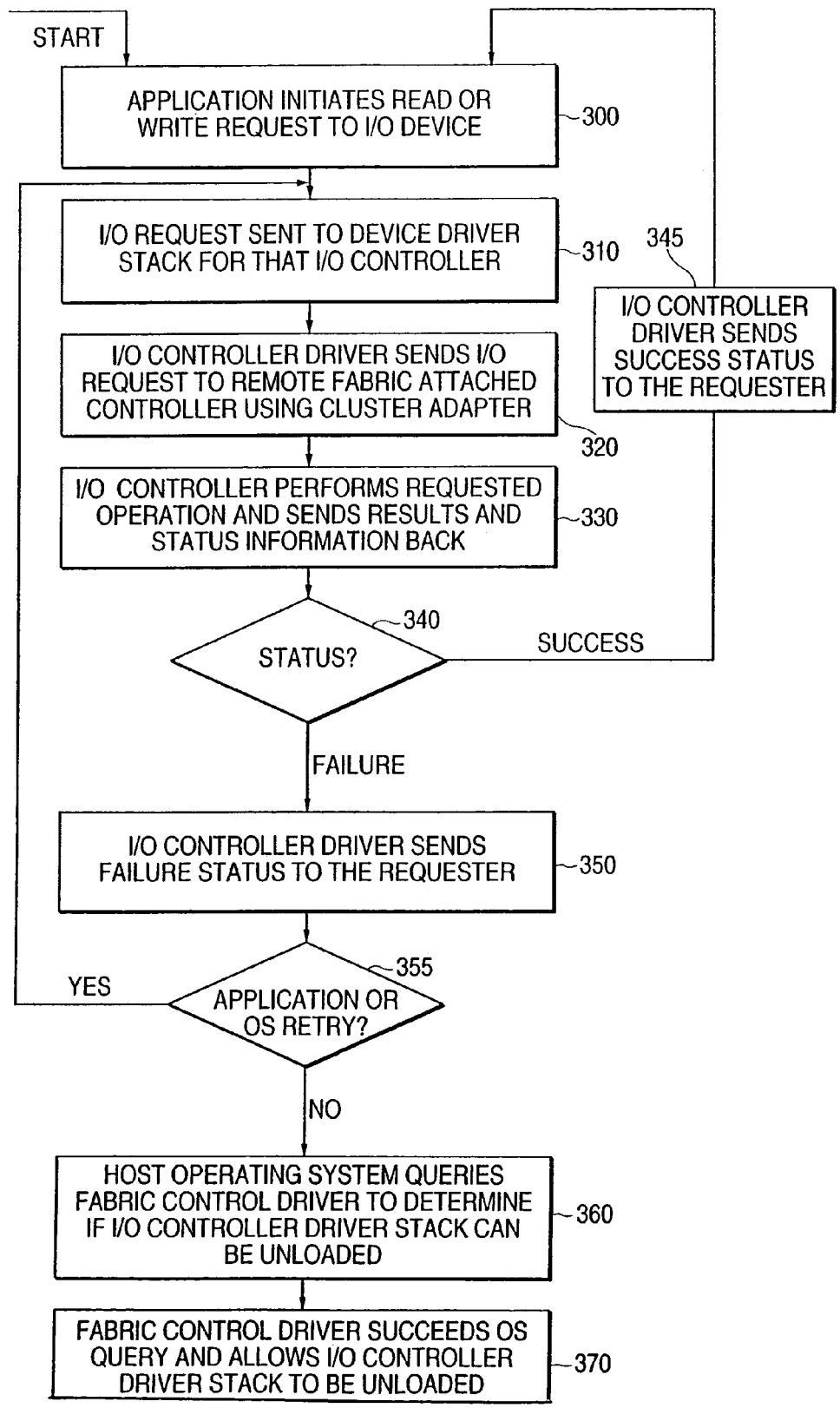
FIG. 3 is a flowchart of an earlier disadvantageous arrangement.

As illustrated in FIG. 2 and FIG. 3, in block 300, an application 270 originates an I/O request by issuing a read or write request to an I/O device. As illustrated in FIG. 2, and block 310 of FIG. 3, the I/O request is sent to a fabric attached storage I/O controller 140, for example. In turn, the controller storage driver stack 280 sends the I/O request to the remote fabric attached I/O controller 140 using the cluster adapter 240 in block 320. The I/O controller 140 then performs the requested operation and sends the results and status to the requesting application 270 in block 330. In block 340, the I/O controller determines the status of the operation. If the status is a "success" then the operation proceeds back to the starting point to await a read or write request from another application after the I/O fabric controller 2250 send the success status to the requesting application 270. On the other hand, if the status is a "failure", then all pending I/O operations will be completed in error by the cluster adapter 240. The failure status is sent to the I/O controller storage driver stack 280 in block 350. Then, in block 355, a determination is made as to whether or not a retry is ordered by either the application or OS (operating system). If so, then the operation returns to block 310 and if not, the operation proceeds to block 360. After all retry attempts have been exhausted, the I/O controller 140 may be assumed to be permanently unavailable. The host operating system then queries the fabric controller driver 250 to determine if the I/O controller storage drive stack 280 can be unloaded and, if so, the I/O controller storage driver stack 280 is unloaded in block 370. Once the I/O controller storage driver stack 280 is unloaded in block 370, the I/O controller 140 becomes unusable for the host 100 even after a transient failure has disappeared.

Figure 4:
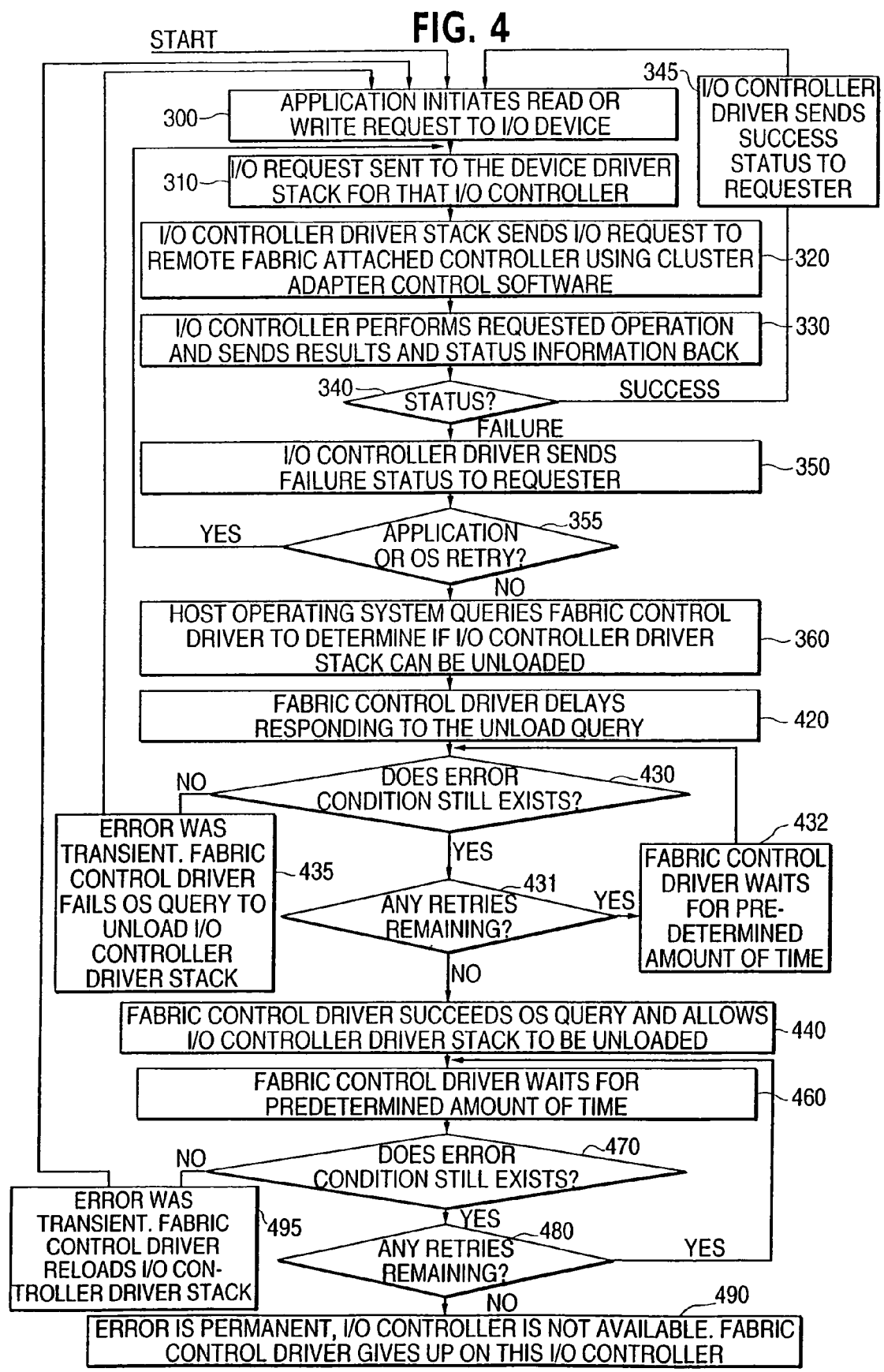
FIG. 4 is a flowchart of an advantageous example of the operation of the present invention.

In view of this disadvantage, in the present invention, the state of an I/O controller that has been deemed to be unavailable is tracked and recovery proceedings are initiated if it has been determined that the failure was transient. As illustrated in FIG. 4, the recovery in accordance with the present invention may consist of one or more of the following actions on the part of the fabric control driver 250. Blocks 300, 310, 320, 330, 340, 345, 350, 355 and 360 of FIG. 4 are identical to those of FIG. 3.

Upon the determination of a failure in block 340, the host operating system checks with a fabric controller driver 250 to determine if the I/O controller storage driver stack 280 should be unloaded in block 360 after the same operations noted above with regard to FIG. 3. The cluster adapter 240 is aware of the communication failure. Since the fabric controller driver 250 initially caused the I/O controller storage driver stack 280 to be loaded by reporting it to the operating system, it is also involved in the process of unloading the I/O controller storage driver stack 280.

As noted in block 420 of FIG. 4, the fabric controller driver 250 delays responding to the operating system request to allow additional time for a transient error condition to abate. Then, as illustrated in block 430, the fabric controller driver 250 can check to determine if the error condition still exists by trying to communicate with the I/O controller 140. If the fabric controller driver 250 is able to communicate with the I/O controller 140, then the request to unload the controller storage driver stack 280 is rejected and the error was transient as noted in block 435 and the operation returns to block 300. The controller storage driver stack 280 therefore remains loaded and the controller remains available for new I/O requests to be issued.

If the error condition still exists, the fabric controller driver 250 may determine in block 440 whether the number of retries (to communicate with the I/O controller 140) is greater than a predetermined number, that is, are there any retries remaining? If not, the operation may return to block 420 after awaiting an additional predetermined time period in block 132 prior to again trying to communicate with the I/O controller 140.

On the other hand, if the fabric controller driver has determined in block 440 that the number of retries is greater than a predetermined number, that is, there are no more retries remaining, then the fabric controller driver 250 unloads the controller storage driver stack in block 440, thereby eliminating the use of the failed I/O controller 140 and then the operation proceeds to block 460 where the fabric controller driver 250 waits for a predetermined period of time.

Upon the passage of a predetermined period of time, the I/O controller storage driver stack 280 again tries to communicate with the I/O controller 140 to determine if the error condition still exists as noted in block 470. If the error condition no longer exists, then the fabric controller driver 250 can cause the unloaded controller storage driver stack 280 to be reloaded in block 495 and the operation proceeds back to block 300.

If the error condition is determined to still exist in block 470, then the operation proceeds to block 480, wherein the fabric controller driver 250 determines if the number of retries is greater than a predetermined number, that is, determines if there are any retries remaining and, if not, the operation returns to block 460 where the fabric controller driver 250 waits an additional predetermined period of time. On the other hand, if it has been determined that the number of retries is greater than a predetermined number, that is, there are no retries remaining, the error is considered to be permanent in block 490 and the I/O controller 140 is unavailable and the fabric controller driver gives up on the I/O controller 140.

The above noted procedure allows the failed I/O controller 140 to be automatically placed in service again once the transient failure condition has abated. No human intervention or explicit intervention is required to restart the controller storage driver stack 280 on the host 100 and no additional effort is required on the part of the host operating system or the I/O controller storage driver stack 280 to recover from the failure. The procedure applies to all classes and types of fabric attached I/O controllers and no device class specific action need be taken and the procedure is automatically available even for controller driver stacks that do not implement any retry/recovery schemes.

While this procedure is specifically applicable to NGIO (next generation input/output) clusters and NGIO cluster adaptor control software operating under Windows 2000, it is of course understood that it is also applicable to other non-NGIO clusters (e.g., Future 110 (F10) and INFINI-BAND) and other non-Windows 2000 operating systems.

The above procedure allows for the automatic recovery from transient cluster failures and applies to all classes and types of fabric attached I/O or controllers and does not require any changes to the existing operating system or I/O controller driver stacks to benefit from this procedure. Having a common error recovery procedure that does not require any explicit action on the part of the I/O controller independent hardware vendor or the operating system vendor therefore enhances the reliability and accessibility in cluster environments.

Figure 5:
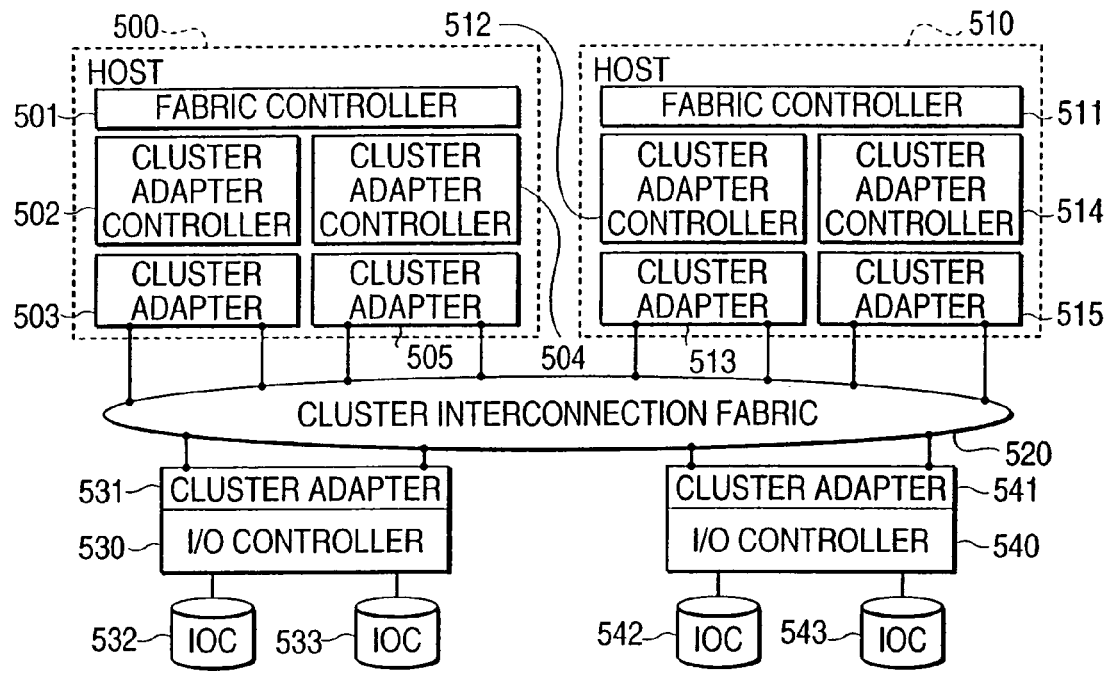
FIG. 5 is a block diagram of another example cluster.

FIG. 5 illustrates another example cluster having multiple hosts and I/O units containing I/O controllers. The hosts and I/O units are connected together by a cluster interconnection fabric.

Host 500 includes a fabric controller software 501 and cluster adapter controller 502 and cluster adapter controller 504 which respectively control cluster adapter 503 and cluster adapter 505. Similarly, host 510 has fabric controller 511, cluster adapter controllers 512 and 514, and cluster adapter 513 and cluster 515. The cluster adapters are all connected to the cluster interconnection fabric 520 which is in turn connected to I/O controller 530, containing cluster adapter 531, and I/O controller 540, containing cluster adapter 541. IOC units 532, 533, 542 and 543, are connected to the I/O controllers 530 and 540.

Note that while only two hosts 500 and 510 and two I/O controllers 530 and 540 are illustrated, many more hosts and I/O controllers may be connected together via the cluster interconnection fabric 520, but only two of each have been shown for simplicity.

Clusters are typically used for server work loads where reliability and uninterrupted operation are extremely important. One common technique used to achieve this goal is to remove single points of failure in the cluster. Failures in the fabric interconnection links and switches may be recovered from by creating redundant cluster interconnection fabrics. Failures of I/O controllers may be recovered from by using multiple I/O controllers with matching I/O devices that each perform the same I/O operation and take over when there is a failure of an I/O controller. Furthermore, it is important that the host does not lose cluster connectivity when the cluster adaptor that connects the host to the cluster fails. Multiple cluster adapters in the host avoids the cluster connectivity problem. That is, if a host has multiple cluster adaptors, when one cluster adaptor fails, another functioning cluster adapter may be used to communicate with the I/O controllers and other elements connected to the cluster interconnection fabric that this host was using.

Unfortunately, when using Windows 2000, for example, the use of multiple cluster adapters does not ensure the continued operation upon an adapter failure. If a cluster adapter fails, the operating system unloads the device driver stacks for I/O controllers that are the "children" of this adapter, that is, those I/O controllers that are using this adapter to communicate with a remote I/O controller. The device driver stack for a fabric attached I/O controller is not given the opportunity to recover from the failure by using a different cluster adapter. However, in the present invention, the operating system is prevented by the host from unloading the device driver's stack for the I/O controllers when the cluster adapter fails, thereby eliminating the cluster adapter failure as a single point of failure.

Figure 6:
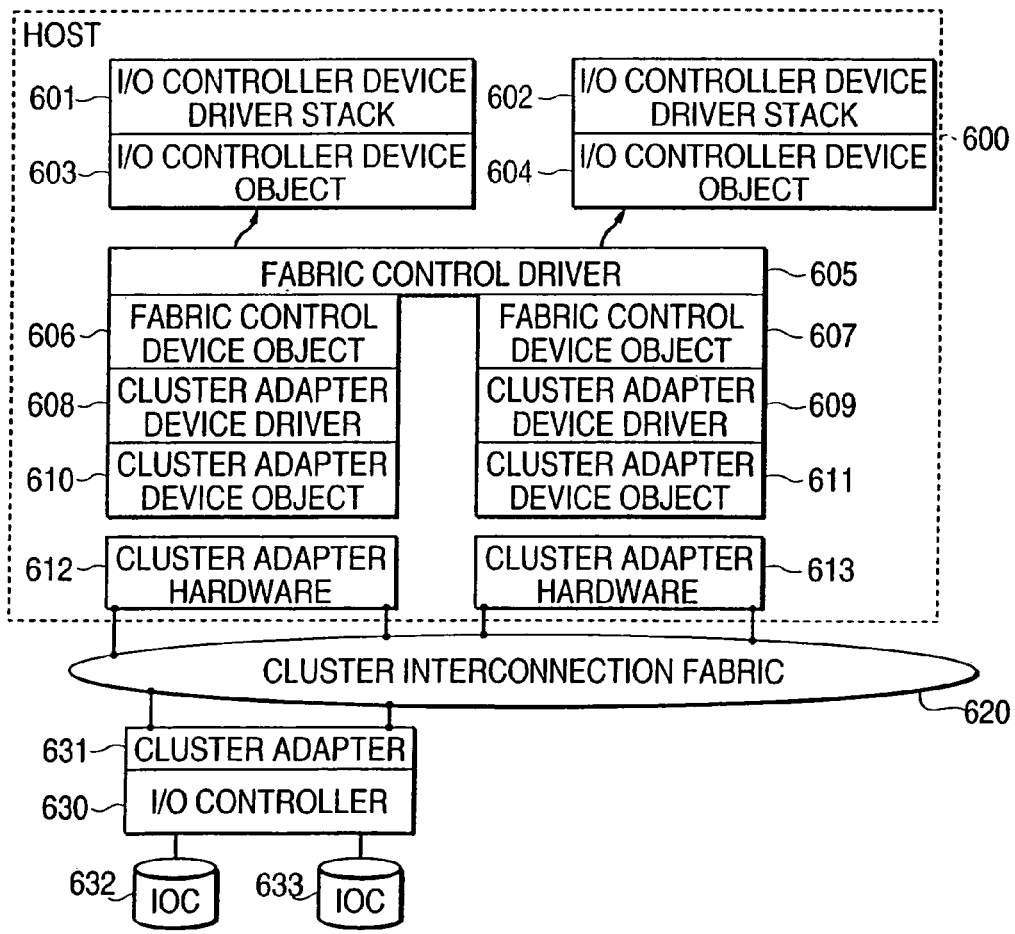
FIG. 6 illustrates an example of the host software using two I/O controllers.

FIG. 6 is a block diagram of another example cluster. With modern operating systems, an I/O controller is typically accessed via a controller specific device driver that is written by the vendor for the I/O controller. Under Windows 2000, for example, each hardware device is represented by a device object. A device object represents the cluster adapter and separate device objects respectively represent each I/O controller that a host uses. Each device object has an associated device driver that controls the device object. As shown in FIG. 6, the example host 600 of a cluster is using two fabric attached I/O controllers and, as shown, each hardware device is represented by a device object and a device driver is associated and loaded for each such device object. Only one host of the cluster has been shown for simplicity.

That is, the host 600 has an I/O controller device driver stack 601 and its respective I/O controller device object 603, as well as I/O controller device driver stack 602 and its respective I/O controller device object 604. The I/O controller device object 603 and the I/O controller device object 604 operate in conjunction with the fabric control driver 605. Associated with the fabric control driver 605 is the fabric control device object 606 and its associated cluster adapter device driver 608 and its associated cluster adapter device object 610. Furthermore, the fabric control driver 605 is associated with the fabric control device object 607 and its respective cluster adapter device driver 609 and cluster adapter device object 611. These various elements are associated with cluster adapter hardware 612 and cluster adapter hardware 613 which are both connected to the cluster interconnection fabric 620. The cluster interconnection fabric 620 is also connected via cluster adapter 631 to I/O controller 630 which is in turn connected to IOC 632 and 10C 633. Although only two channels are illustrated, it is of course understood that any number of channels may be included in the host 600.

Figure 7:
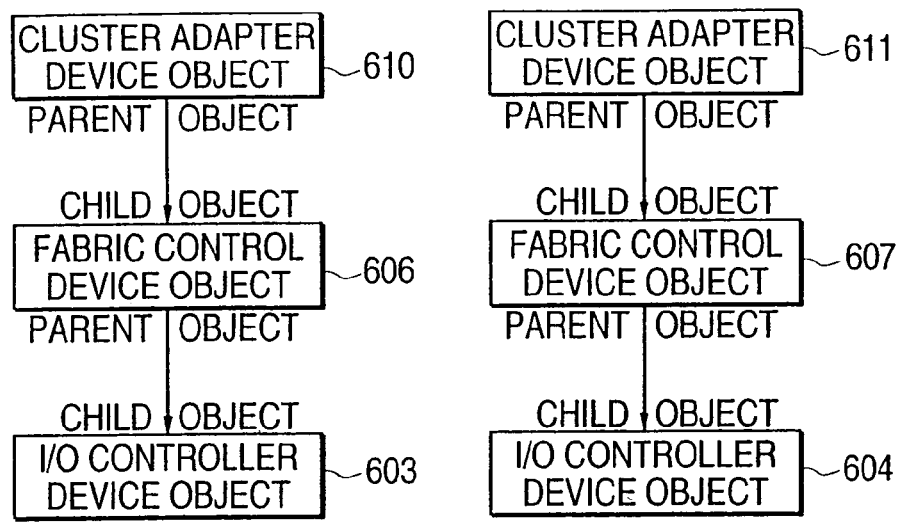
FIG. 7 illustrates an example of the hierarchy among device objects.

As illustrated in FIG. 6, the cluster adapter device object is created by the driver that controls the bus to which the cluster adapter is attached. For example, if the cluster adapter is attached to the PCI bus in the host, the Windows 2000 PCI bus driver, for example, creates the device object for the cluster adapter. The cluster adapter device driver is associated with this device object and controls the cluster adapter. The fabric control driver provides a bus abstraction for the fabric and is loaded on top of the cluster adapter drive which will perform administrative tasks including assigning I/O controllers to hosts and managing the fabric. The fabric control driver is also responsible for creating device objects for fabric attached I/O controllers used by the host. Each I/O controller device driver has an associated controller driver stack. Under Windows 2000, for example, there is a hierarchy among the device objects that represent different hardware devices. FIG. 7 illustrates the device object hierarchy for the example host 600 of FIG. 6.

In FIG. 7, the device object for each fabric attached I/O controller has a "parent" cluster adapter device object. Under Windows 2000, for example, all of the I/O controller device objects must be the "children" of the device object that represents the bus they are attached to. In this case, the I/O controller device object must be a "child" of one of the fabric control device objects. Each fabric control device in turn is the "child" device of the cluster adapter that caused this instance of the fabric control driver to be loaded. That is, for example, I/O controller device object 603 is the "child" of fabric control device object 606 which is in turn the "child" of cluster device object 610 and I/O controller device object 604 is the "child" object of fabric control device object 607 which is in turn the "child" of cluster adapter device object 611.

Under Windows 2000, for example, whenever a "parent" device object is destroyed, its "child" device objects are destroyed first. Thus, if a cluster adapter malfunctions, its device object must be destroyed since it is no longer functional and its corresponding driver must be unloaded. Before the operating system performs these functions, it will destroy the device object for the corresponding I/O controller since it is a "child" of the device object being destroyed. In this example, in host 600, it is possible for one cluster adapter to be operative and available for use in communicating with the other I/O controller. If the device driver stack for the other I/O controller is given an opportunity, it may recover from the failure of its cluster adapter. However, this opportunity never arises since this device object must be deleted for the operating system to be able to delete the device object for its cluster adapter. In other words, the parent/child relationship between the device objects is static and cannot be dynamically modified. If a "parent" device object gets a fatal error, all of its corresponding "child" device objects must be destroyed even if they are capable of recovering from the failure.

Figure 8:
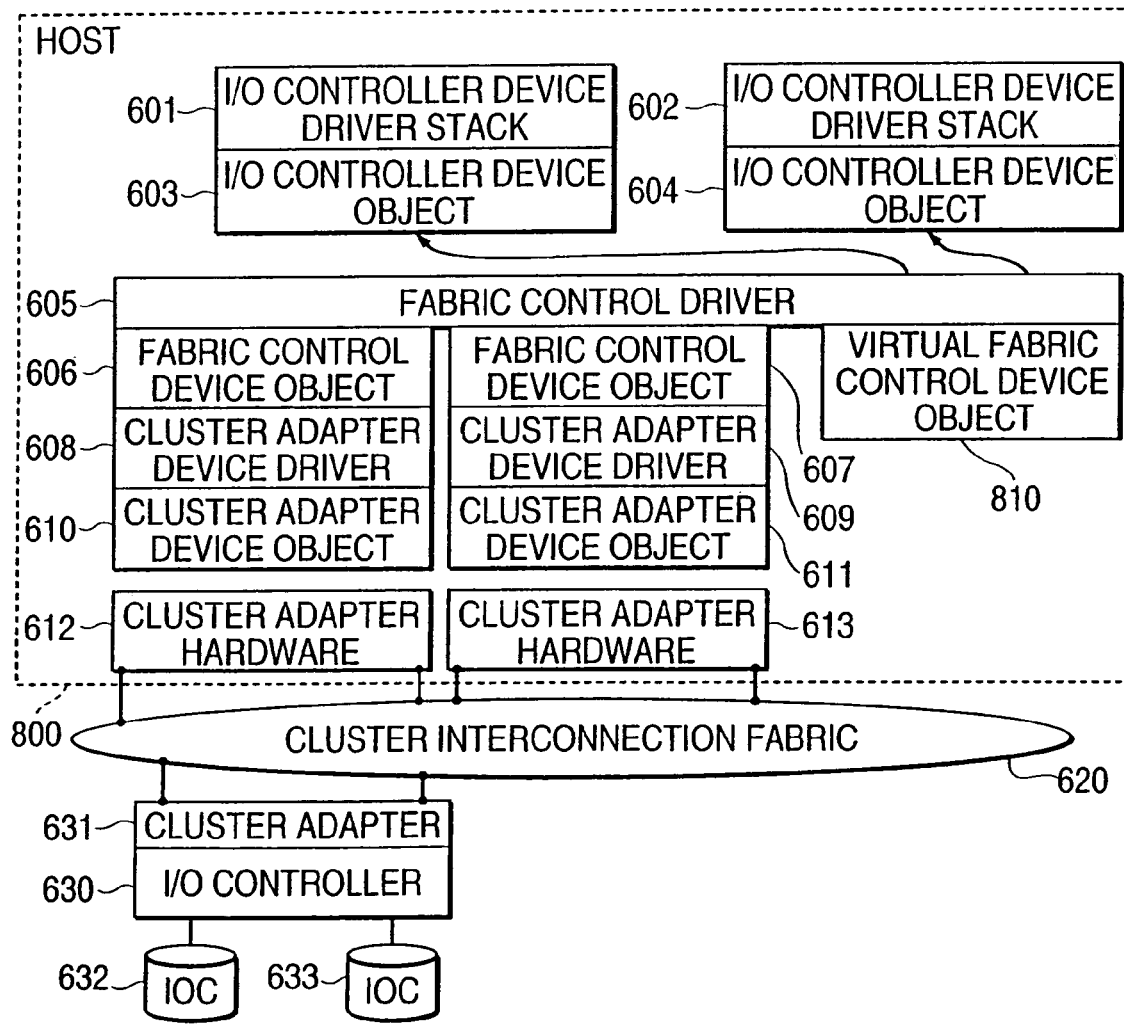
FIG. 8 illustrates an example of a host with a virtual fabric control device object.

In the present invention, the fabric controlled driver can prevent the device object for a fabric attached I/O controller from being destroyed if a cluster adapter fails. The fabric control driver creates a virtual fabric control device object that represents fabric connectivity for each fabric it is connected to. As long as connectivity to that fabric exists via at least one functioning cluster adapter, this virtual device object exists. The device objects for the example host 600 would then be as shown in FIG. 8.

Host 800 differs from host 600 of FIG. 6 in that the additional virtual fabric control device object 810 has been added. The corresponding device object hierarchy is shown in FIG. 9.

Figure 9:
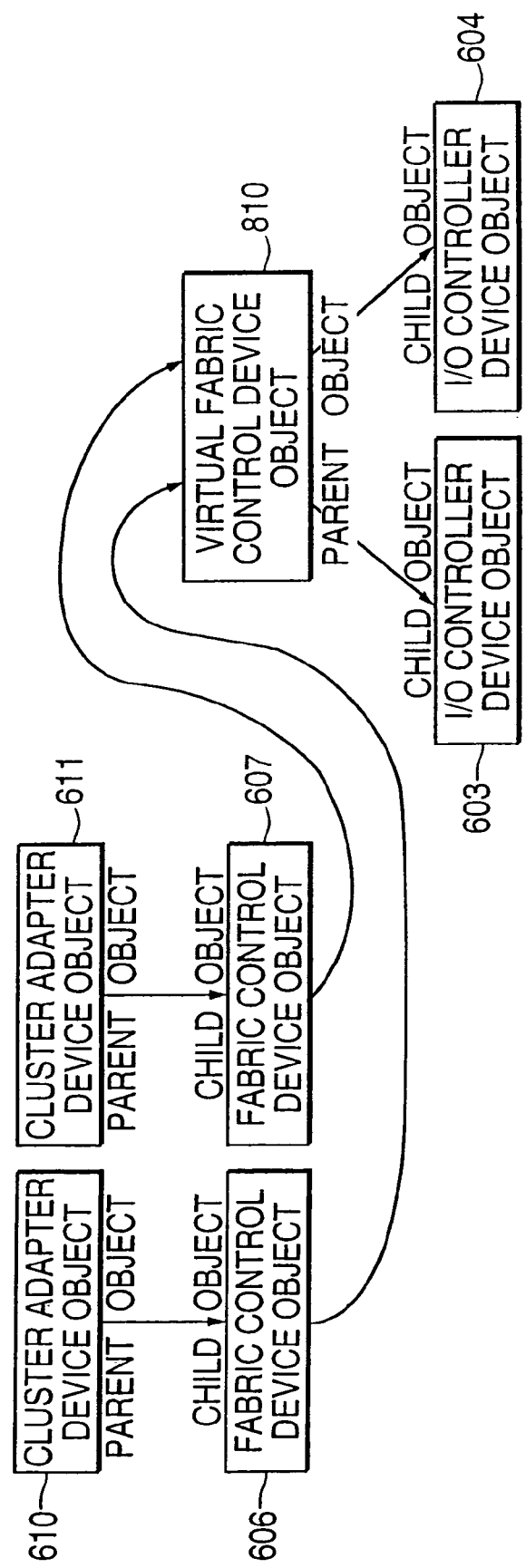
FIG. 9 illustrates an example of the device object hierarchy with a virtual fabric control device object.

As shown in FIG. 9, the device objects for the fabric attached I/O controllers are no longer "child" device objects for a cluster adapter device object. If a cluster adapter malfunctions, the operating system can destroy its device object without having to destroy the fabric attached I/O controller's device object. The device driver stacked for the I/O controller will therefore have an opportunity to recover from the failure by using another functioning adapter. If it is able to recover from the failure, it will remain available and, if it is not available to recover from the failure, it can be independently destroyed by the operating system.

It is the responsibility of the fabric control driver to destroy the virtual fabric control device object only if all of the connectivity to that fabric is lost. That is, if only one cluster adapter is connected to that fabric, the virtual fabric control device object is destroyed immediately after the corresponding cluster adapter device object is destroyed. Thus, the virtual fabric control device object for that fabric is destroyed if and only if all connectivity to a given fabric is lost. When that happens, the effected I/O controller device objects are automatically destroyed.

The procedure used by the fabric control driver to create the virtual fabric control device object is the same as the procedure used to create any "normal" device object. The primary difference is that the virtual device object is not directly associated with any specific cluster adapter hardware. Each "normal" cluster adapter device object that is created by the fabric control driver is associated with a specific cluster adapter. When a cluster adapter becomes inoperative, the "normal" device object associated with it is destroyed. On the other hand, while the "normal" device object has the ability to connected to the cluster using a specific cluster adapter, the virtual fabric control device object has the ability to connect to the cluster using at least one of a plurality of available cluster adapters. As long as there is some connectivity to the cluster via one functioning cluster adapter, the virtual fabric control device object remains. When the last available cluster adapter on a system becomes unavailable, connectivity to the cluster is lost and the virtual fabric control device object is destroyed.

Figure 10:
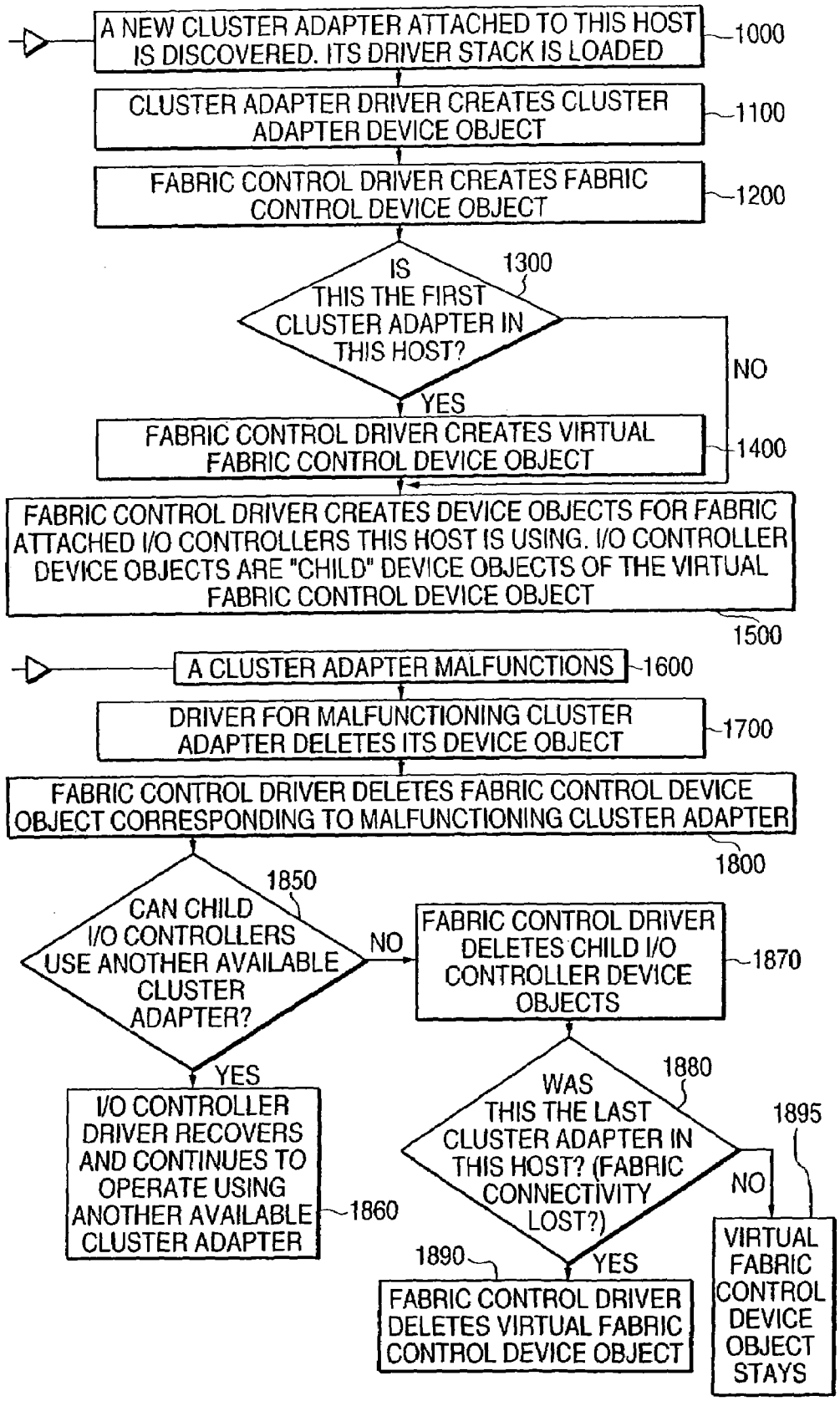
FIG. 10 is a flowchart of an advantageous example of the operation of the present invention.

Referring to FIG. 10, in box 1000, a new cluster adapter attached to a host is discovered and its driver stack is loaded. Then, as noted in box 1100, the cluster adapter driver creates a cluster adapter device object. Then, in box 1200, the fabric control driver creates a fabric control device object. In box 1300, a determination is made as to whether the newly discovered cluster adapter is the first cluster adapter in this host. If so, the fabric control driver creates a virtual fabric control device object in box 1400 and if not, the fabric control driver creates device objects for fabric attached I/O controllers being used by this host in box 1500. The I/O controller device objects are the "child" device objects of the virtual fabric control device object.

The operation noted above with regard to FIG. 10 is the same as the operation of the arrangement illustrated in FIG. 6, except for the formation of the virtual fabric control device object which, as illustrated in FIG. 9, is disposed between the fabric control device objects 606 and 607 and the I/O controller device objects 603 and 604.

Further referring to FIG. 10, assuming that a cluster adapter malfunctions in box 1600, the driver for the malfunctioning cluster adapter deletes its device object in box 1700. The fabric control driver then deletes the fabric control device object corresponding to the malfunctioning cluster adapter in box 1800. In box 1850, a determination is made as to whether the "child" I/O controllers can use another available cluster adapter. If so, in box 1860 the I/O controller driver recovers and continues to operate using another available cluster adapter. If not, the fabric control driver deletes the "child" I/O controller device objects in box 1870. In box 1880, a determination is made as to whether the malfunctioning cluster adapter was the last cluster adapter available in this host, that is, whether fabric connectivity has been lost. If so, then the fabric control driver deletes the virtual fabric control device object in box 1890 and if not, the virtual fabric control device object is untouched in box 1895.

Stated in other terms, referring to FIG. 9, if the cluster adapter device object 610 is deleted, then the fabric control device object 606 is then also deleted. However, in view of the virtual fabric control device object 810, the I/O controller device object 603 is not deleted but may in fact remain operative in conjunction with the virtual fabric control device object 810 and the fabric control device object 607 and the cluster adapter device object 611.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. A method, comprising:
  receiving a request from an operating system (OS) to unload an Input/Output (I/O) controller driver stack; and
  delaying a response to the OS after determining the request is associated with a transient communication error between a host and an I/O controller, which is recoverable after a pre-determined period of time.

2. The method of claim 1 further comprising, unloading the I/O controller driver stack after determining the request is not associated with a transient communication error between the host and the I/O controller.

3. The method of claim 2 further comprising, periodically accessing the OS to attempt to automatically re-establish communication between the host and the I/O controller and, if successful, reloading the I/O controller driver stack onto the host.

4. The method of claim 1 further comprising, re-attempting to confirm communications between the host and the I/O controller driver stack after the pre-determined period of time elapses.

5. The method of claim 1 further comprising, accessing the OS to load the I/O controller driver stack into the host before receiving the request from the OS.

6. The method of claim 1 further comprising periodically attempting to re-establish lost communication between the host and the I/O controller at configurable intervals if no communication exists between the host and the I/O controller.

7. The method of claim 1 further comprising instructing the OS to unload the I/O controller driver stack from the host if a non-transient error condition is detected.

8. A system, comprising:
  an Input/Output (I/O) controller driver stack; and
  a control driver, wherein the control driver monitors communication errors between a host and an I/O controller, and if a communication error is transient, the control driver delays responding to an Operating System (OS) request to unload the I/O controller driver stack from the host for a predetermined period of time, during which if communication is re-established between the host and the I/O controller, the OS request is denied.

9. The system of claim 8, wherein the control driver attempts to re-establish communications between the host and the I/O controller at configurable periods of time if communications between the host and the I/O controller are lost.

10. The system of claim 8, wherein the control driver responds to the OS to unload the I/O controller driver stack if an error between the host and the I/O controller is determined to be non-transient.

11. The system of claim 8 further comprising:
  one or more second I/O controller driver stacks; and
  one or more second I/O control drivers, wherein each of the one or more second I/O controller driver stacks are associated with a unique one of the one or more second I/O control drivers forming a unique pair, and wherein each unique pair monitors communications between a unique second host and its unique I/O controller.

12. The system of claim 8, wherein the I/O controller driver stack advertises resources available to the host via the I/O controller.

13. The system of claim 12, wherein the I/O controller accesses the resources based on instructions received from applications processing on the host.

14. The system of claim 8, wherein, initially, the I/O controller driver stack is loaded within memory of the host and the host is in communication with the I/O controller.

15. A method, comprising:
receiving from an Operating System (OS) a request to unload an Input/Output (I/O) controller driver stack from memory of a host;
determining the request is associated with a transient error condition associated with a temporarily loss of communications between the host and an I/O controller; and
delaying a response to the OS for at least a predetermined period of time to determine if the loss of communications is resolved and if resolved, denying the request of the OS.

16. The method of claim 15 further including instructing the OS via the response to unload the I/O controller driver stack if the error condition cannot be resolved within the predetermined period of time.

17. The method of claim 16 further including periodically attempting to re-establish communications with the I/O controller at configurable intervals if the I/O controller driver stack is unloaded from the memory of the host.

18. The method of claim 17 further including instructing the OS to re-load the I/O controller driver stack if communications with the I/O controller is successfully re-established.

19. The method of claim 15 further including initially instructing the OS at startup of the machine to load the I/O controller driver stack into the memory of the host.

20. The method of claim 15 further including preventing access of applications processing on the host from accessing resources associated with the I/O controller if the I/O controller driver stack is not loaded in the memory of the host.

* * * * *